United States Patent

Onishi et al.

[11] Patent Number: 5,614,144
[45] Date of Patent: Mar. 25, 1997

[54] METHOD OF MANUFACTURING THREE-DIMENSIONAL COMPACT

[75] Inventors: Yasuhiko Onishi; Takashi Yamamori; Youzou Yamashita; Ichiro Suzuki; Toshiya Aoyama, all of Yokkaichi, Japan

[73] Assignees: Sumitomo Wiring Systems, Ltd., Yokkaichi; Takahashi Seiki Co., Ltd., Nagoya, both of Japan

[21] Appl. No.: 539,755

[22] Filed: Oct. 6, 1995

Related U.S. Application Data

[63] Continuation of Ser. No. 189,727, Feb. 1, 1994, abandoned.

[30] Foreign Application Priority Data

Feb. 2, 1993 [JP] Japan .................................. 5-039409

[51] Int. Cl.$^6$ .................................................. B29C 49/00
[52] U.S. Cl. ....................... 264/454; 264/523; 264/540; 264/536; 425/174.4; 425/527
[58] Field of Search ........................ 264/400, 454, 264/515, 516, 523, 531, 534, 536, 540, 154, 155, 159; 425/174.4, 527

[56] References Cited

U.S. PATENT DOCUMENTS

| | | | |
|---|---|---|---|
| 3,469,076 | 9/1969 | Saslawsky | 219/121 |
| 3,941,157 | 3/1976 | Barnett | 264/45.3 |
| 3,993,508 | 11/1976 | Erlichman | 29/623.2 |
| 4,539,463 | 9/1985 | Piccioli et al. | 264/536 |
| 4,578,329 | 3/1986 | Holsappel | 430/18 |
| 4,667,384 | 5/1987 | Miller | 264/25 |
| 4,738,612 | 4/1988 | Kikuchi et al. | 264/540 |
| 4,782,728 | 11/1988 | Thatcher | 264/536 |
| 5,030,083 | 7/1991 | Kohno et al. | 264/540 |
| 5,128,091 | 7/1992 | Agur et al. | 264/536 |
| 5,549,066 | 10/1985 | Piccioli et al. | 264/536 |

FOREIGN PATENT DOCUMENTS

| | | |
|---|---|---|
| 1321806 | 12/1989 | Japan . |
| 3-108524 | 5/1991 | Japan ............................ B29C 49/00 |

*Primary Examiner*—Catherine Timm
*Attorney, Agent, or Firm*—Sughrue, Mion, Zinn, Macpeak & Seas

[57] ABSTRACT

Disclosed herein is a method of manufacturing a wire harness protector (2), which can reduce the manufacturing cost with excellent productivity. A resin material having a black or gray tone, or a resin material containing an additive absorbing a laser beam is employed as a molding resin material. A hollow compact (1) is molded by NC blow molding. Then, the as-formed hollow compact (1) is cut with a laser beam, to manufacture a solid wire harness protector (2).

7 Claims, 15 Drawing Sheets

METHOD OF MANUFACTURING THREE-DIMENSIONAL COMPACT

RELATED APPLICATIONS

This is a continuation of application Ser. No. 08/189,727, filed Feb. 1, 1994 now abandoned.

FIELD OF THE INVENTION

The present invention relates to a method of manufacturing a three-dimensional resin product, which is suitable for manufacturing a three-dimensional elongated resin product in a household electric appliance, an automobile or the like.

BACKGROUND OF THE INVENTION

To protect a wire harness, formed for example by bundling a plurality of electric wires onto the body of an automobile, a wire harness protector is employed. The wire harness protector, a three-dimensional compact of a resin material, holds the wire harness in a prescribed condition and prevents the wire harness from coming in contact with other materials, thereby protecting the wire harness.

Such a wire harness protector can be molded by injection molding into a three-dimensional shape, such as the shape of an automobile body or a wire harness interconnection path.

However, it is relatively difficult and costly to manufacture a large-sized product having a complicated shape, such as the wire harness protector, by injection molding. Large-scale equipment is required, which corresponds to an increase in equipment costs. The design of the metal mold, for a large-sized product, is complicated, with a corresponding increase in the manufacturing cost of the metal mold itself.

On the other hand, numerically controlled (NC) blow molding, a form of resin molding, is advantageously capable of: facilitating three-dimensional molding of an elongated product with a high degree of freedom of design; forming a large-sized product at a low equipment cost, because it requires a smaller machine than that employed in injection molding; employing a metal mold with a low manufacturing cost of a zinc alloy or an aluminum alloy with a molding pressure of about 0.5 to 0.7 MPa, i.e., a pressure about 100 times smaller than the pressure in injection molding; and performing precise molding.

Numerically controlled blow molding has recently been improved, and is capable of suppressing the occurrence of burrs and contributing to the reduction of the manufacturing cost. Numerically controlled blow molding can control the thickness of a parison by adjusting a clearance between a metal mold and a core for properly changing the thickness of the as-obtained molding without varying the metal mold, thus preventing the occurrence of burrs in a multilayer manner, which contributes to the reduction of the manufacturing cost. Numerically controlled blow molding molds different materials through a proper combination of resin materials without varying the metal mold, and, by using insert molding, reduces the numbers of elements and steps needed.

SUMMARY OF THE INVENTION

According to the present invention, a method of manufacturing a three-dimensional compact comprises a step of preparing a resin material having a black or gray tone, a step of molding a hollow compact from the resin material by numerically controlled blow molding, and a step of cutting the hollow compact with a laser beam. The present invention thereby manufactures a solid three-dimensional compact.

Preferably, the resin material is a heat-resistant acrylonitrile-butadiene-styrene resin, a polycaprolactam blow grade resin, a polybutylene terephthalate blow grade resin, or a polypropylene resin.

Preferably, the heat-resistant acrylonitrile-butadiene-styrene resin is a copolymer of maleic acid and nylon acrylonitrile-butadiene-styrene.

Preferably, the polybutylene terephthalate blow grade resin is a polymer alloy of polybutylene terephthalate and polyolefin.

Preferably, the resin material is an engineering plastic, such as a reformed olefin of polycaprolactam.

Also according to the present invention, the method of manufacturing a three-dimensional compact comprises a step of preparing a resin material containing an additive absorbing a laser beam, a step of molding a hollow compact from the resin material by numerically controlled blow molding, and a step of cutting the hollow compact with a laser beam. The present invention thereby manufactures a solid three-dimensional compact.

Preferably, the additive is titanium dioxide.

Also according to the present invention, a hollow compact which is properly bent in a three-dimensional manner is first molded by numerically controlled blow molding, in response to a target shape of a three-dimensional compact. Then, a prescribed position of the as-formed hollow compact is cut with a laser beam to remove unnecessary portions, such that a three-dimensional compact is manufactured as a solid product.

Preferably, a resin material having a black or gray tone, or a resin material which contains an additive absorbing a laser beam is employed as the molding material for the hollow compact, which allows for smooth cutting with the laser beam.

In the present method of manufacturing a three-dimensional compact, as described above, a resin material having a black or gray tone, or a resin material containing an additive absorbing a laser beam is employed to mold a hollow compact by numerically controlled blow molding. The as-formed hollow compact is cut with a laser beam to manufacture a solid three-dimensional compact. Thus, it is possible to effectuate the advantages of numerically controlled blow molding to reduce the manufacturing cost for the solid three-dimensional compact as well as to smoothly cut the hollow compact with a laser beam, thereby ensuring excellent productivity.

Accordingly, an object of the present invention is to provide a method of manufacturing a three-dimensional compact which can reduce manufacturing costs and which can provide excellent productivity, by combining numerically controlled blow molding, which is suitable for molding a three-dimensional elongated product, with laser beam machining.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1A:
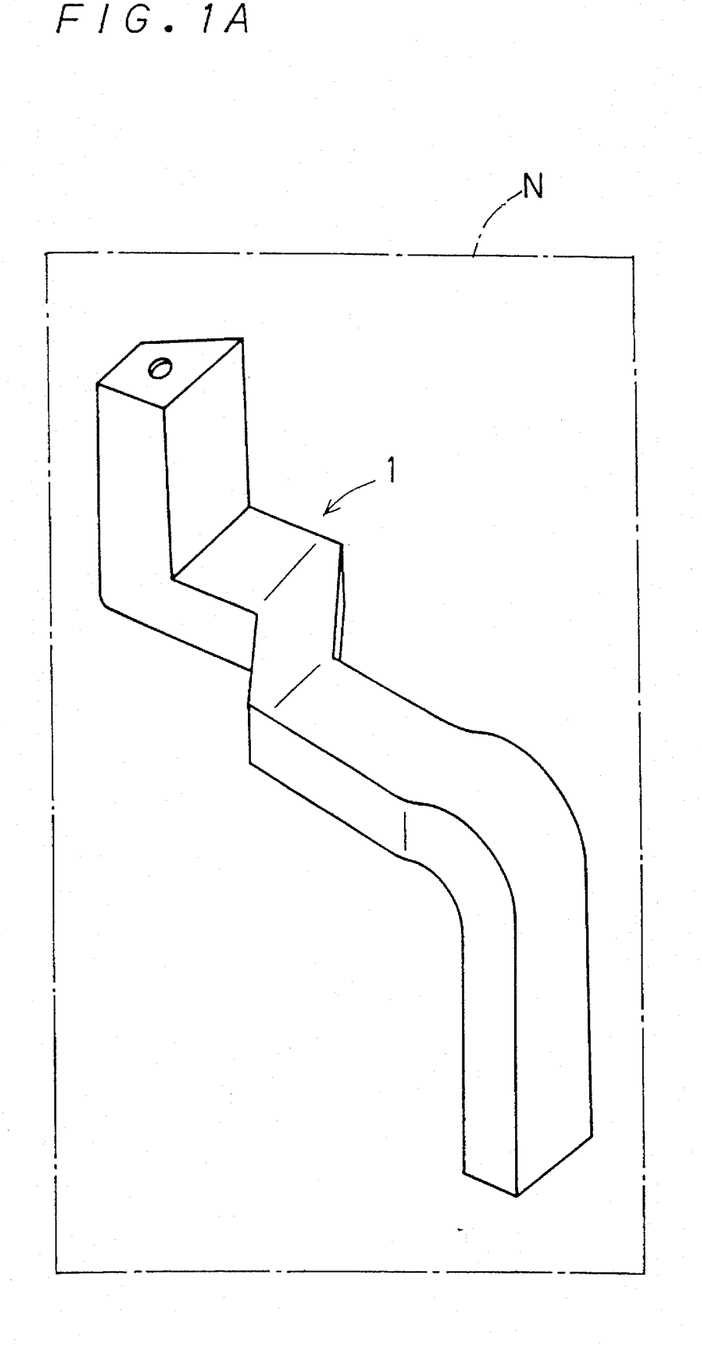
FIG. 1A is a perspective view schematically showing a numerically controlled blow molding step in an embodiment of the present invention.
Figure 1B:
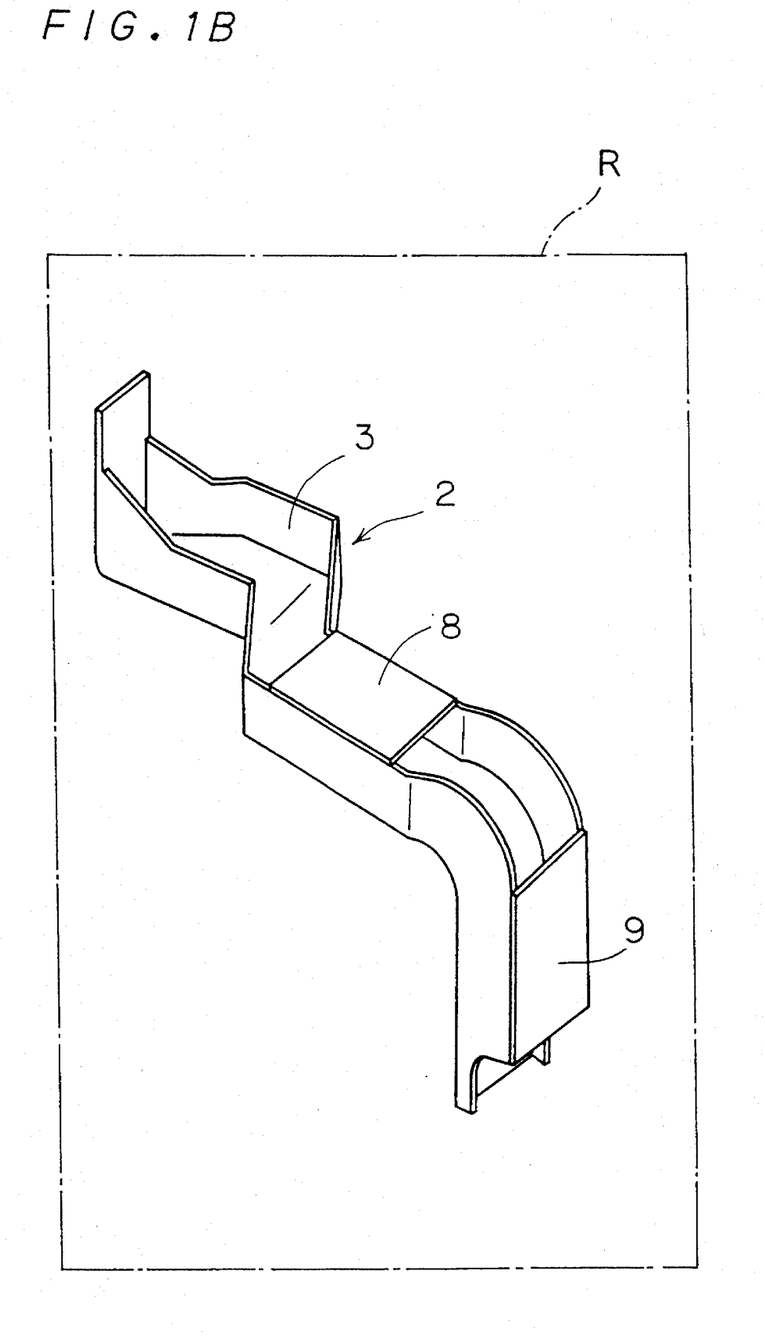
FIG. 1B is a perspective view schematically showing a laser beam machining step in the embodiment of the present invention.
Figure 2:
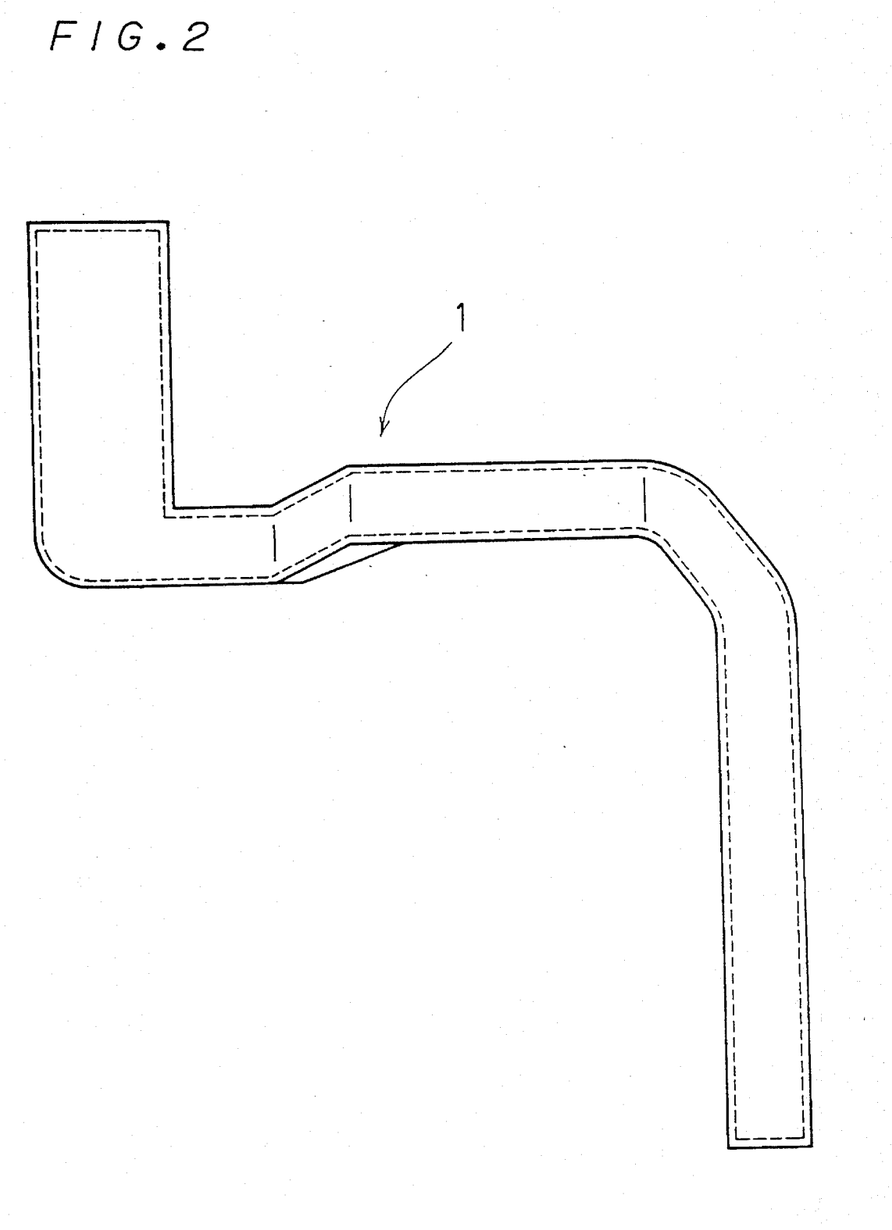
FIG. 2 is a front elevational view showing a hollow compact.
Figure 3:
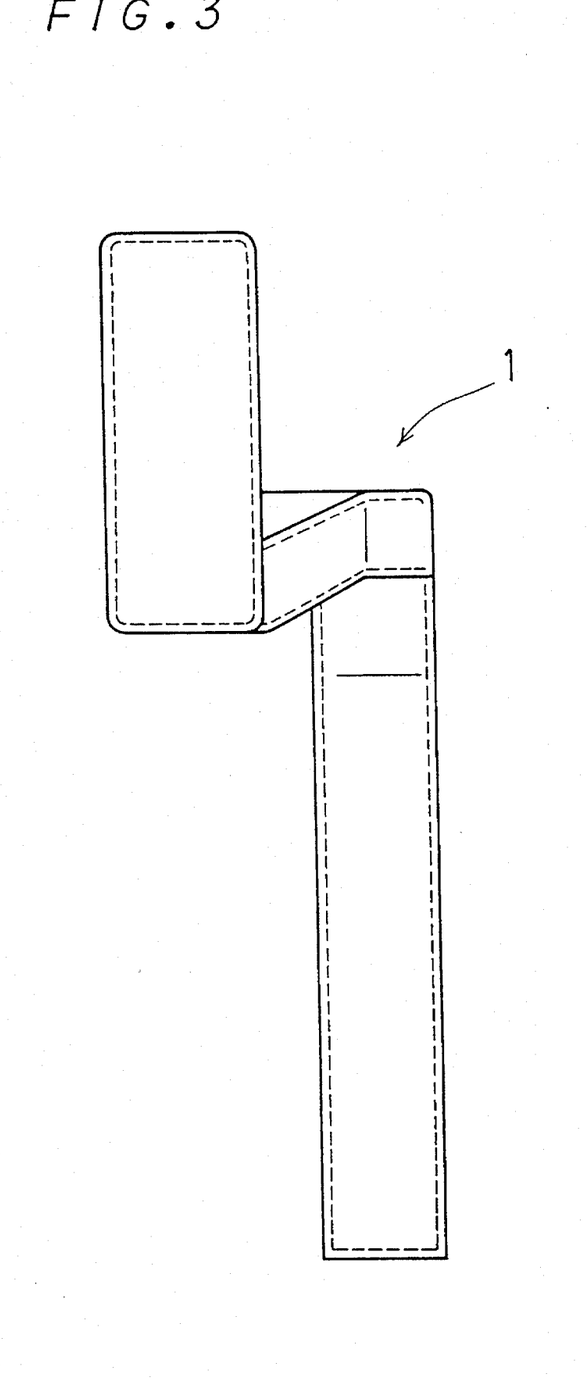
FIG. 3 is a left side elevational view of the hollow compact shown in FIG. 2.
Figure 4:
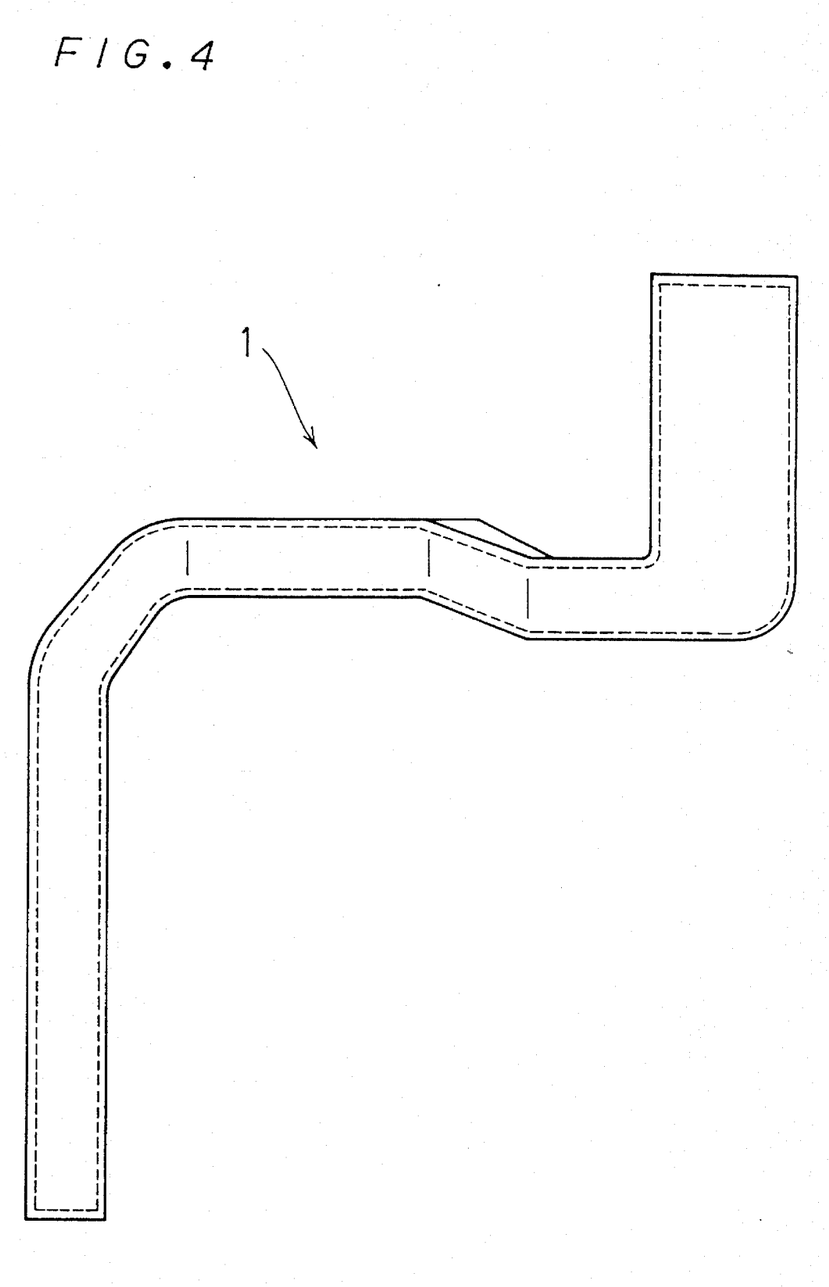
FIG. 4 is a rear elevational view of the hollow compact shown in FIG. 2.
Figure 5:
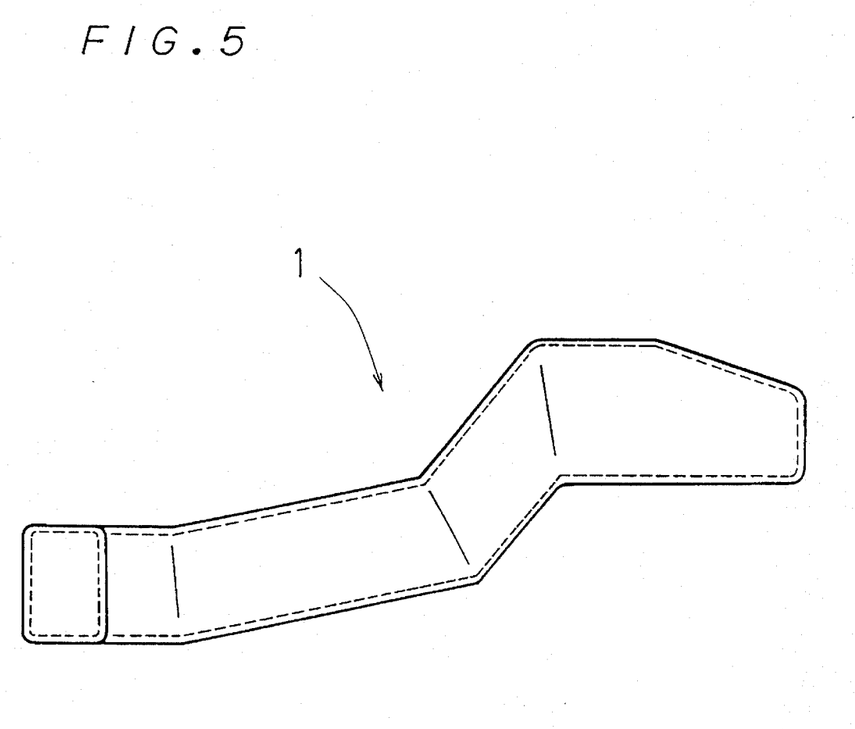
FIG. 5 is a bottom plan view of the hollow compact shown in FIG. 4.
Figure 6:
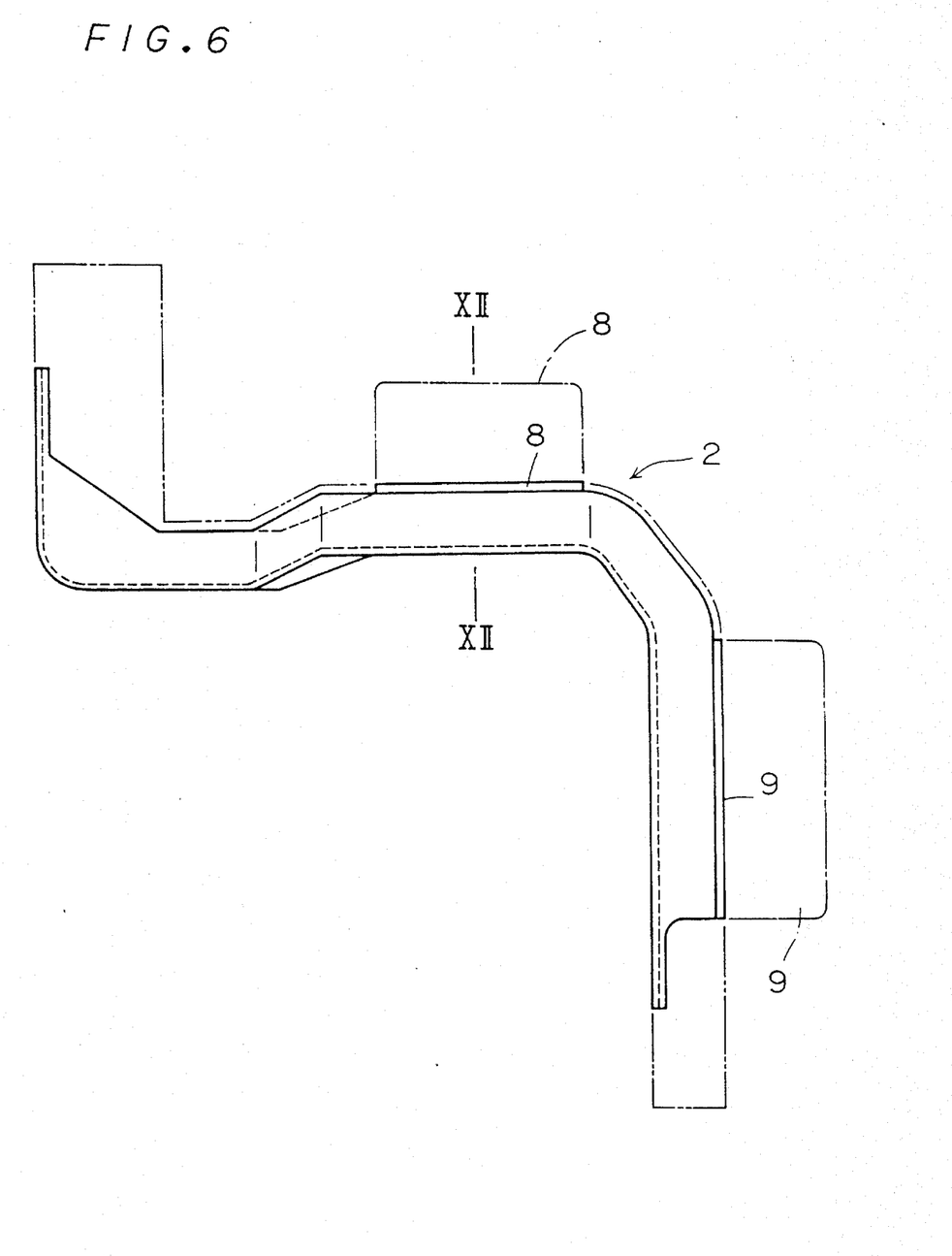
FIG. 6 is a front elevational view showing a wire harness protector.
Figure 7:
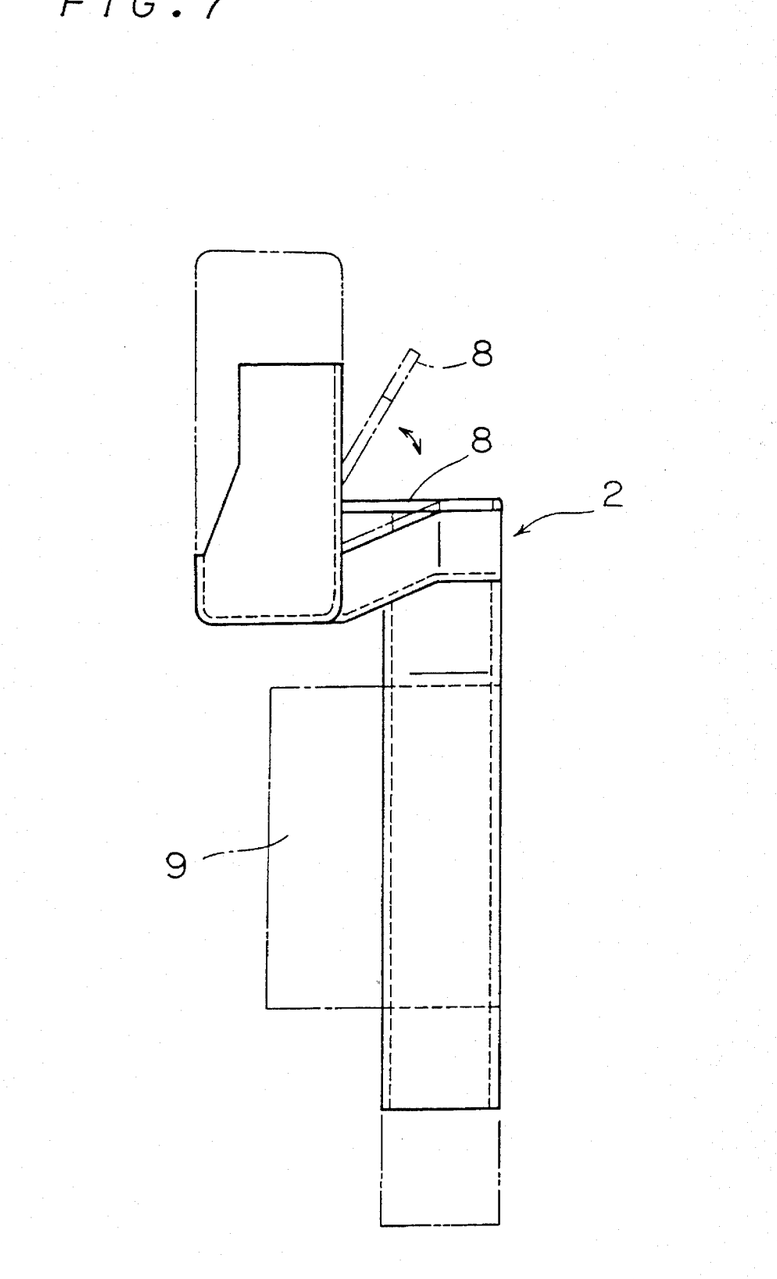
FIG. 7 is a left side elevational view of the wire harness protector shown in FIG. 6.
Figure 8:
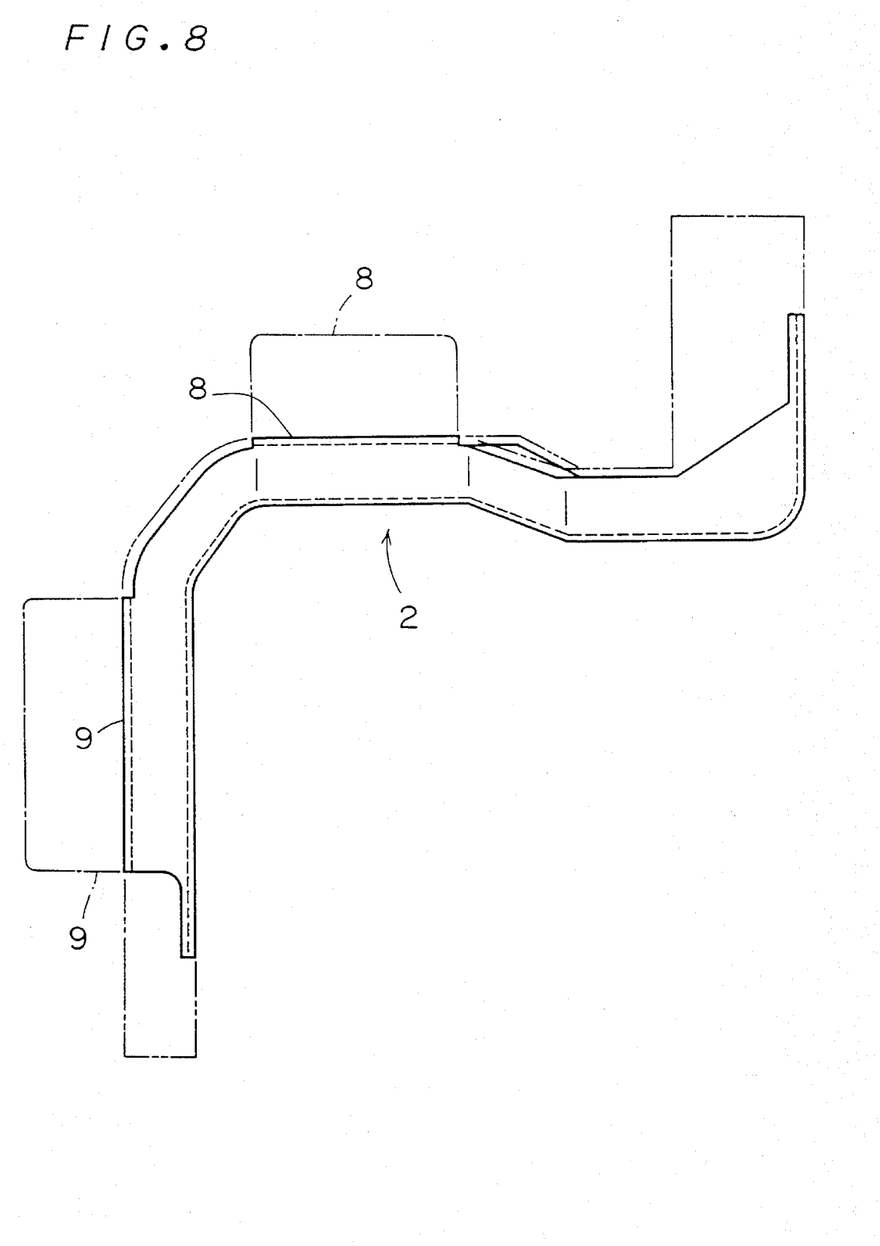
FIG. 8 is a rear elevational view of the wire harness protector shown in FIG. 6.
Figure 9:
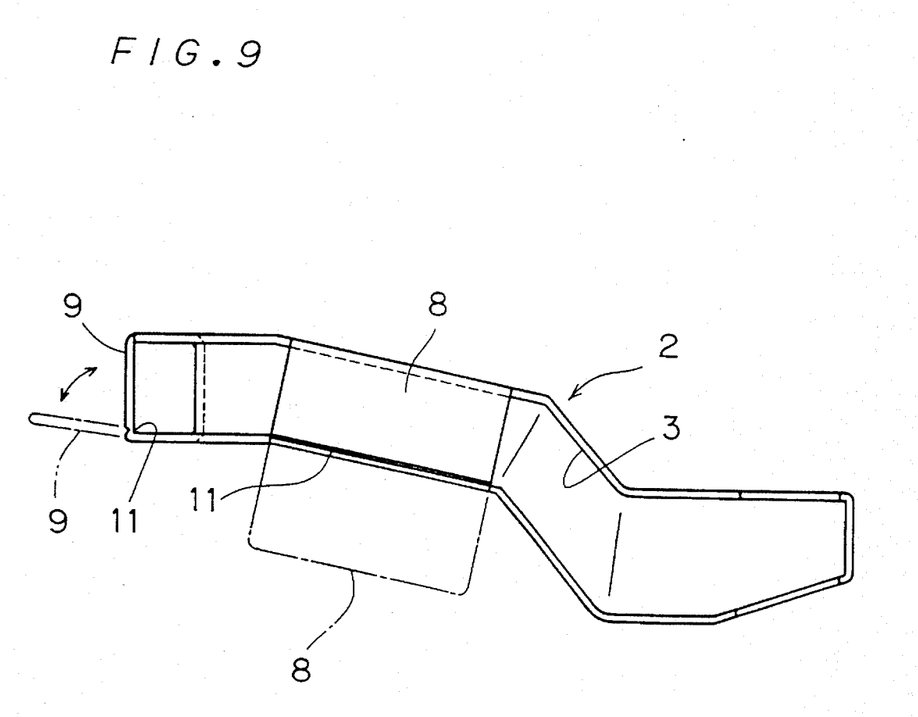
FIG. 9 is a plan view of the wire harness protector shown in FIG. 8.
Figure 10:
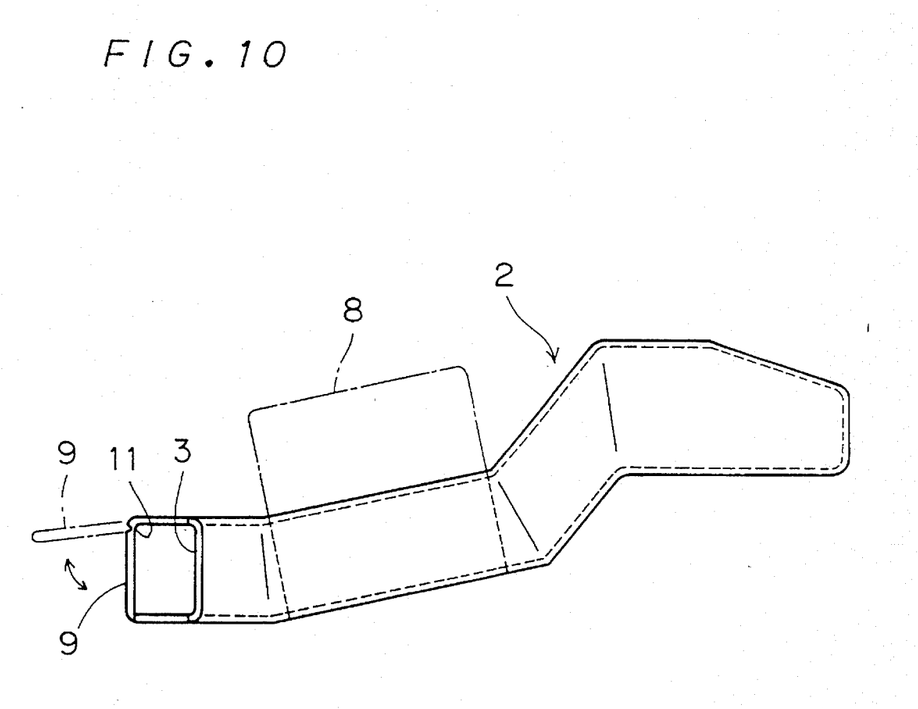
FIG. 10 is a bottom plan view of the wire harness protector shown in FIG. 8.

An embodiment of the present invention is now described with reference to the drawings. FIGS. 1A and 1B are perspective views schematically showing manufacturing steps. FIG. 1A is a perspective view showing a hollow compact 1 which is formed by a numerically controlled blow molding machine N in a numerically controlled blow molding step. FIG. 1B is a perspective view showing a wire harness protector 2, which is a solid three-dimensional compact obtained by cutting the hollow compact 1 with a laser beam machine R in a laser beam machining step.

The resin used for such molding is prepared from a resin material, which is engineering plastics which serves as a structural material suitable for blow molding and has a black or gray tone in view of machinability with a laser beam.

Table 1 shows examples of such a resin material.

TABLE 1

|  | Heat-Resistant ABS Resin | Poly-caprolactam Blow Grade | PBT Glow Grade | Poly-propylene |
| --- | --- | --- | --- | --- |
| Flexural Strength (Kg/cm$^2$) | 680 | 400 | 780 | 320 |
| Flexural Elasticity (Kg/cm$^2$) | 18000 | 8000 | 23000 | 10500 |
| Izod Impact Value (Kg · cm/cm) | 12 | >50 | 5.4 | 4.0 |
| Thermal Deformation Temperature (°C.) [4.6 Kg/cm$^2$] | 147 | 182 | 163 | 115 |

Referring to Table 1, the heat-resistant ABS resin (heat-resistant acrylonitrile-butadiene-styrene resin) is, for example, prepared from a copolymer of maleic acid and nylon ABS. The PBT blow grade (polybutylene terephthalate blow grade) is, for example, prepared from a polymer alloy of PBT and polyolefin, or engineering plastics, such as a reformed olefin of polycaprolactam.

The numerically controlled blow molding machine N is formed by a numerically controlled horizontal parison blow molding machine which comprises, for example, an in-line screw unit, an X/Y/Z axis driving part and a numerically controlled unit. The laser beam machine R is formed, for example, by an articulated robot system employing a YAG laser.

First, the aforementioned resin material is prepared (preparation step), and employed so that a parison is arranged in a form block of a drag in the numerically controlled blow molding machine N. Thereafter, a cope is clamped on the drag and air is supplied into the parison from a prescribed air supply hole (FIG. 1A). This leads to the formation of a hollow compact 1 which is bent into the three-dimensional form of a rectangular cylinder in response to a wire harness protector 2, as shown in FIGS. 2–5 (numerically controlled blow molding step).

Then, the cope and the drag are opened to take out the as-formed hollow compact 1, which in turn is cut with the laser beam machine R to remove unnecessary portions, as shown by the two-dot chain lines in FIGS. 6–10. This leads to the manufacture of the wire harness protector 2, which is substantially U-shaped in section, and which has a wire harness storage cavity 3 along its longitudinal direction, as shown by the solid lines in FIGS. 6–10 (laser beam machining step).

Figure 11:
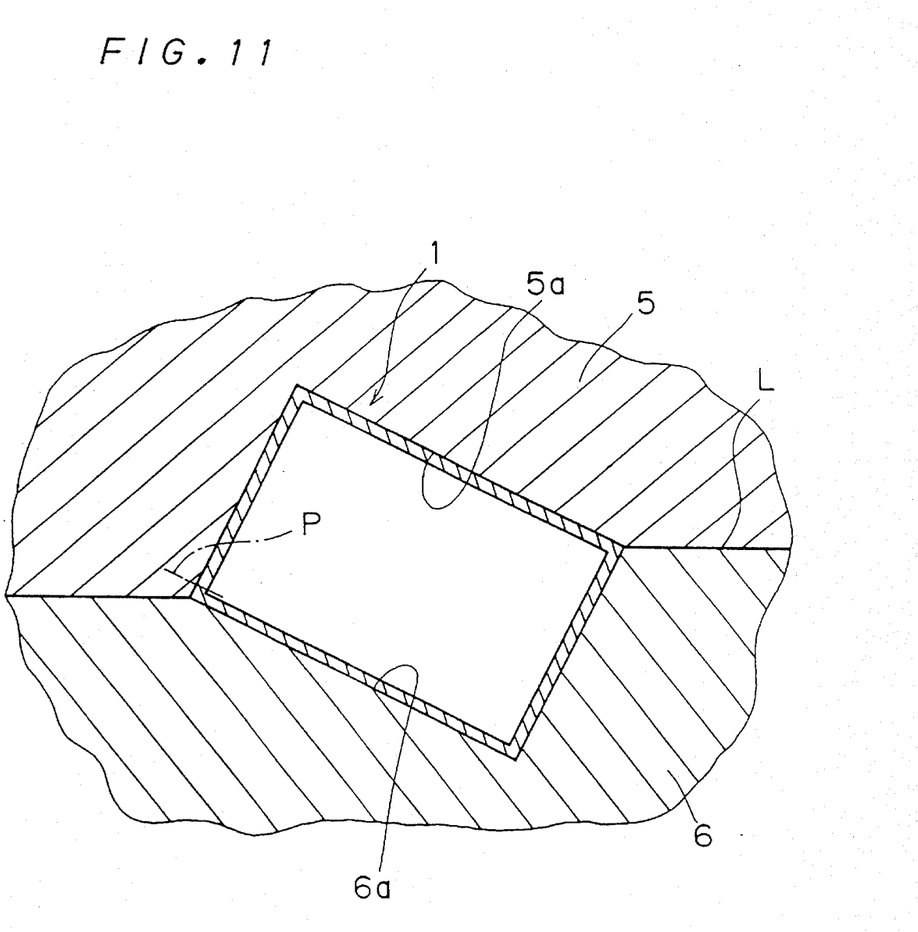
FIG. 11 is a partially fragmented sectional view showing the numerically controlled blow molding step.
Figure 12:
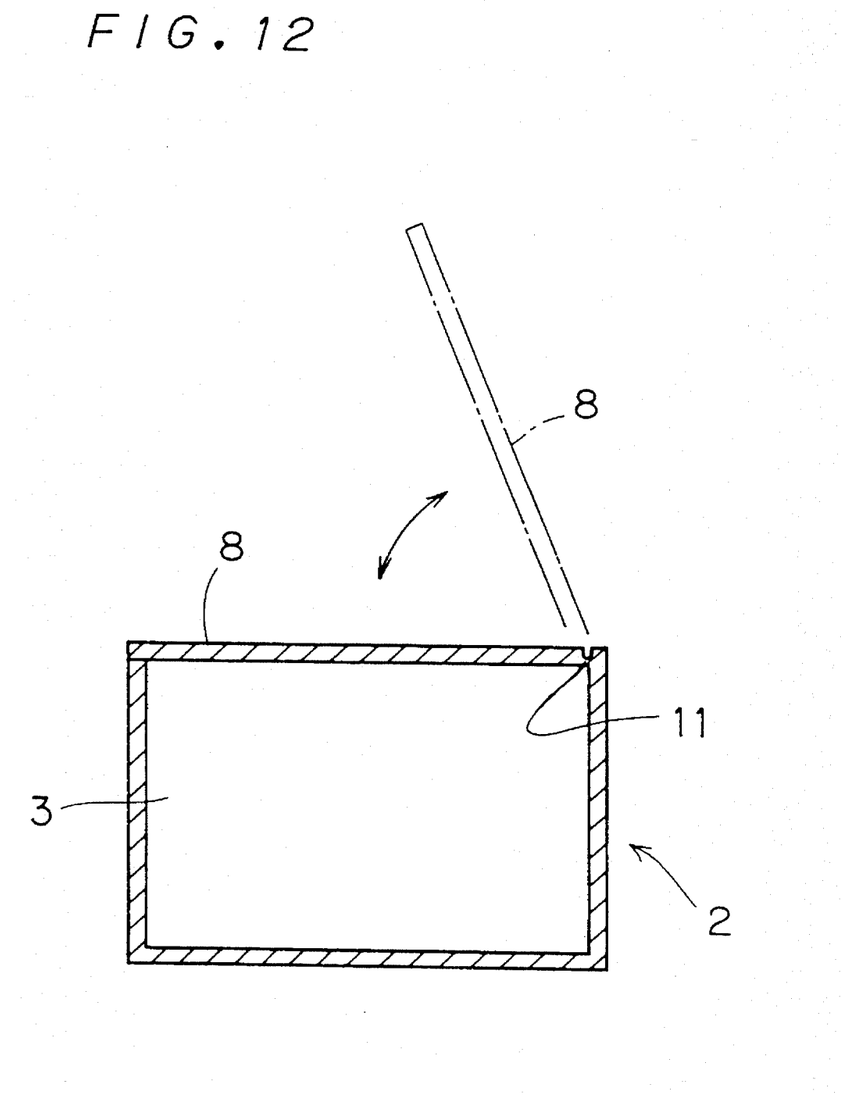
FIG. 12 is a sectional view taken along the line XII—XII in FIG. 6.

Respective form blocks 5a and 6a of the cope 5 and the drag 6 may be designed such that a portion P which is cut with a laser beam is located on a divided plane L of the cope 5 and the drag 6, as shown in FIG. 11. Thus, the cope 5 is released from the drag 6 and opened so that the hollow compact 1 is first cut with the laser beam along the cut portion P along the divided plane L, and is then taken out from the form block 6a of the drag 6. Thereafter, the remaining cut portion is subjected to laser beam machining to cut and remove unnecessary portions, such that the wire harness protector 2 is manufactured in a prescribed shape.

As shown in FIGS. 1B and 6–10, regulating cover portions 8 and 9 having proper lengths are left on the upper and side portions of an open side edge of the wire harness storage cavity 3 which is provided in the wire harness protector 2.

Further, first edges of the regulating cover portions 8 and 9 are cut with the laser beam, while second edges thereof are worked into thin coupling members 11, in which the thin coupling members are cut substantially in half with the laser beam along the direction of thickness. The regulating cover portions 8 and 9 are formed to be capable of opening about the positions of the thin coupling members 11, as shown by the one-dot chain lines in FIGS. 6–10 and 12.

In order to use the wire harness protector 2, the regulating cover portions 8 and 9 are temporarily opened to store a wire harness in the wire harness storage cavity 3 along its longitudinal direction. Thereafter, the regulating cover portions 8 and 9 are closed and fixed with tape or the like, so that the wire harness protector 2 may be mounted on a prescribed position of an automobile body. Thereafter, the wire harness is effectively prevented from being removed from the wire harness storage cavity 3 by the respective regulating cover portions 8 and 9.

In the method of manufacturing the wire harness protector 2 according to the embodiment of the present invention, the wire harness protector 2 is not directly molded by injection molding or the like. Instead, the hollow compact 1 is temporarily molded by numerically controlled blow molding into a shape which is responsive to the wire harness protector 2. Thereafter, the hollow compact 1 is cut with a laser beam to manufacture the solid wire harness protector 2, which has a target shape. Thus, it is possible to effectuate the advantages of numerically controlled blow molding: rendering a high degree of freedom of design; facilitating three-dimensional molding of an elongated product; and, when compared to injection molding, forming a large-sized product through the use of a smaller machine, such that equipment costs are reduced.

Further, the molding pressure which is applied to the metal mold in numerically controlled blow molding is remarkably lower than the molding pressure applied in injection molding, such that it is possible to employ a metal mold of a zinc alloy or an aluminum alloy in numerically controlled blow molding. Thus, the cost for manufacturing the metal mold itself is reduced, which, in turn, reduces the manufacturing cost. Particularly in regard to a three-dimensional compact which is manufactured in a relatively small quantity, the effect of reducing the manufacturing cost is high when compared with that in injection molding.

According to the numerically controlled blow molding of the present invention, it is also possible to form a product having a small thickness substantially without regard to the resin flow in the metal mold, unlike injection molding, thereby reducing the weight of the wire harness protector. In addition, excellent heat resistance can be attained due to the engineering plastics.

Since the molding material is prepared from a resin material having a black or gray tone, it is possible to smoothly cut the hollow compact 1 with a laser beam in a short time with excellent absorption of the laser beam. Further, complicated three-dimensional cutting can be facilitated by using an articulated robot system, thereby ensuring excellent productivity.

When the respective form blocks 5a and 6a are designed so that the portion P which is cut with the laser beam is located on the divided plane L of the cope 5 and the drag 6 as shown in FIG. 11, location in laser beam machining is also facilitated to improve productivity.

Figure 13:
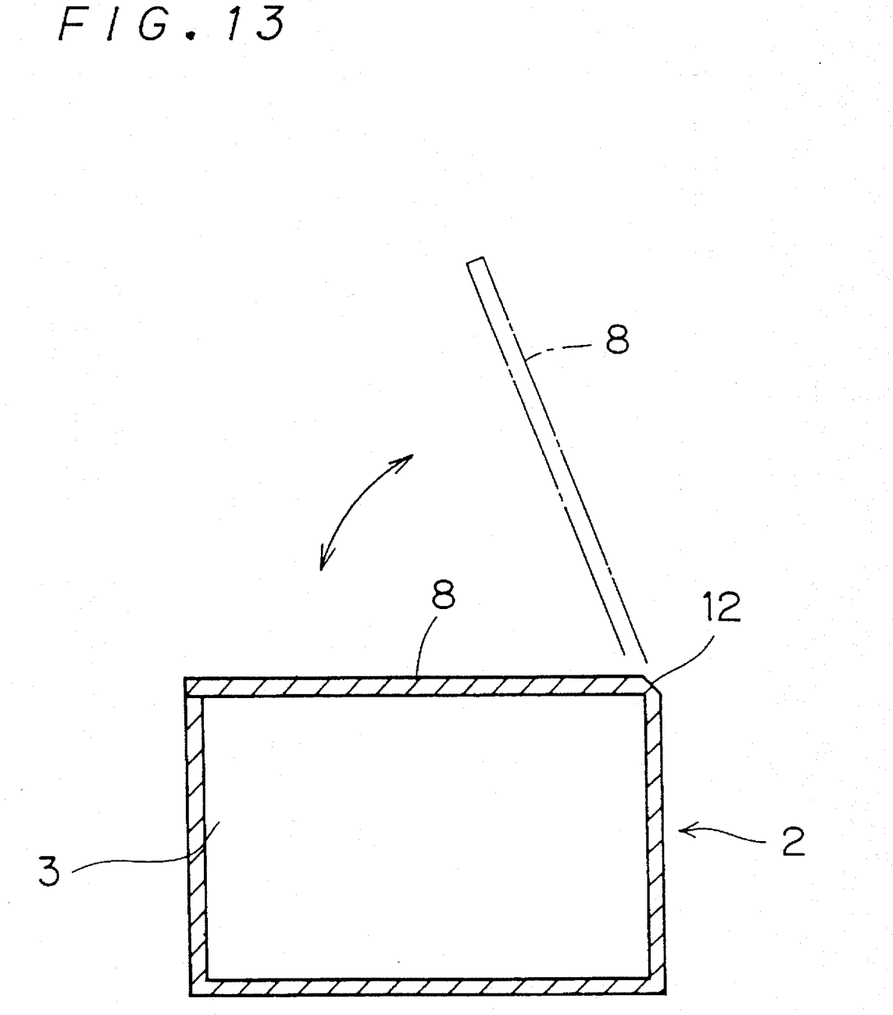
FIG. 13 is a partially fragmented sectional view showing another embodiment of the present invention.
Figure 14:
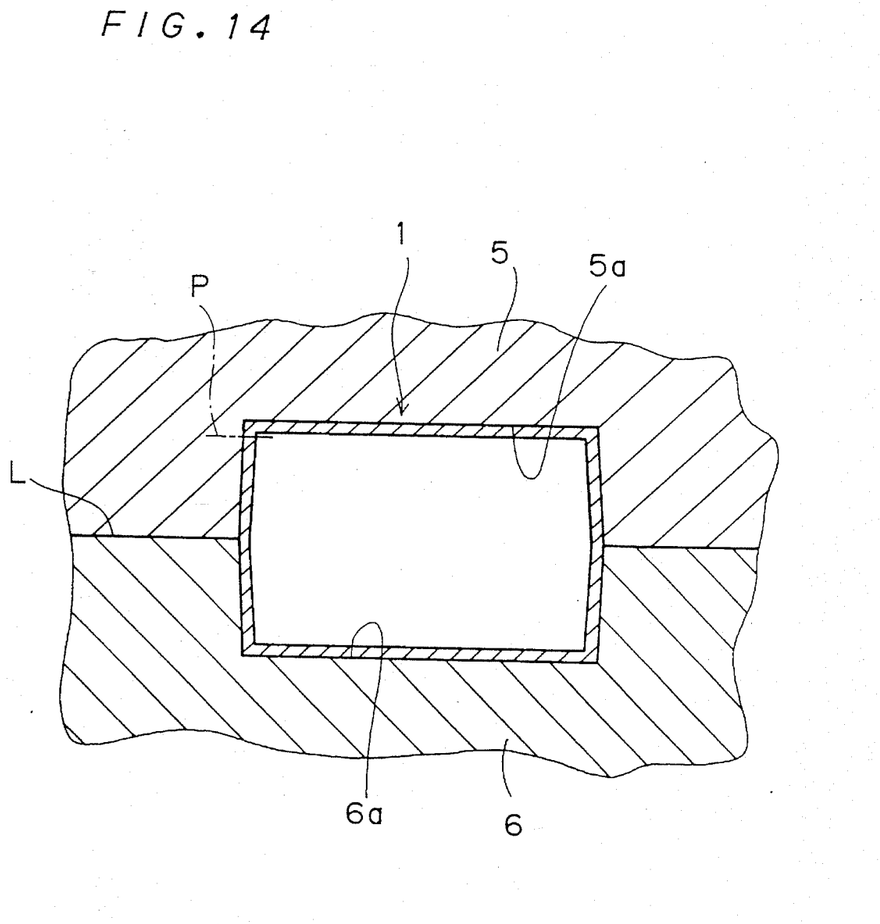
FIG. 14 is a partially fragmented sectional view showing another numerically controlled blow molding step.

While portions, which are cut in substantially equal halves from the whole, of the thin coupling members 11 are cut with the laser beam along the direction of thickness in preparation thereof in the aforementioned embodiment, a corner portion on a second edge of a regulating cover portion 8 may alternatively be cut with a laser beam to form a thin coupling member 12, so that the regulating cover portion 8 is opened/closed about this thin coupling member 12, as shown in FIG. 13. While the respective form blocks 5a and 6a are designed so that the portion P which is cut with the laser beam is located on the divided plane L of the cope 5 and the drag 6, further, form blocks 5a and 6a may alternatively be formed so that no cut portion P is located on a divided plane L of a cope 5 and a drag 6, as shown in FIG. 14.

While the resin material is prepared from that having a black or gray tone in the aforementioned embodiment, the same may alternatively be prepared from that containing an additive absorbing a laser beam, such as $TiO_2$ (titanium dioxide). Also, through the use of an additive absorbing a laser beam, such as $TiO_2$, cutting with the laser beam can be performed smoothly, in a manner similar to that discussed above.

While the above embodiment has been described with reference to a method of manufacturing the wire harness protector 2, the present invention may also be used as an under protector for an automobile or a household electric appliance.

In practice, a numerically controlled horizontal parison blow molding machine comprising an in-line screw unit, an X/Y/Z axis driving part, a numerically controlled unit, and a YAG laser articulated robot system having an operating speed of 2 m/min. are employed to manufacture a wire harness protector for an automobile. First, necessary components, such as a grip portion and a flange portion, are inserted in proper positions of a metal mold. Then, a resin material is molded by numerically controlled blow molding under conditions of a program origin of X of 100, a program origin Y of 300, a nozzle diameter of 9.0 mm, a cope and a drag under room temperature, a stroke of 100 mm, a screw rotational frequency of 95 r.p.m., a screw back pressure of 10 $kg/cm^2$ and a temperature of 195° C. at the forward end of a heating cylinder, to form a hollow compact.

Thereafter, the cope is released and opened so that the hollow compact stored in the drag, which is moved by a turntable, is cut with a laser beam along a cut portion located on a divided plane. The remaining portion of the as-cut hollow compact, which is taken out from the drag by a robot, is cut to complete a wire harness protector. In an experiment, the cycle time of blow molding was 5 to 6 minutes, and it was possible to sufficiently link with a YAG laser articulated robot system.

While the invention has been shown and described in detail, the foregoing description is in all aspects illustrative and not restrictive. It is therefore understood that numerous modifications and variations can be devised without departing from the scope of the invention.

What is claimed is:

1. A method of manufacturing a three-dimensional resin product comprising the steps of:

preparing a resin material having a black or gray tone;

molding a hollow compact from said resin material by numerically controlled blow molding using a numerically controlled blow molding machine, wherein respective form blocks of a cope and a drag are formed so that a portion of the hollow compact to be cut with a laser beam is located on a divided plane between the cope and the drag of the numerically controlled blow molding machine;

releasing and opening the cope, such that the hollow compact remains in the drag; and then cutting said hollow compact within the drag with the laser beam along the portion of the hollow compact that was located on the divided plane of the cope and the drag of the numerically controlled blow molding machine, thereby manufacturing a solid three-dimensional resin product.

2. The method of manufacturing a three-dimensional resin product in accordance with claim 1, wherein said resin material is a heat-resistant acrylonitrile-butadiene-styrene resin, a polycaprolactam blow grade resin, a polybutylene terephthalate blow grade resin, or a polypropylene resin.

3. The method of manufacturing a three-dimensional resin product in accordance with claim 2, wherein said heat-resistant acrylonitrile-butadiene-styrene resin is a copolymer of maleic acid and nylon acrylonitrile-butadiene-styrene.

4. The method of manufacturing a three-dimensional resin product in accordance with claim 2, wherein said polybutylene terephthalate blow grade resin is a polymer alloy of polybutylene terephthalate and polyolefin.

5. The method of manufacturing a three-dimensional resin product in accordance with claim 1, wherein said resin material is a polycaprolactam olefin.

6. A method of manufacturing a three-dimensional resin product comprising the steps of:

preparing a resin material containing an additive absorbing a laser beam;

molding a hollow compact from said resin material by numerically controlled blow molding using a numerically controlled blow molding machine, wherein respective form blocks of a cope and a drag are formed so that a portion of the hollow compact to be cut with a laser beam is located on a divided plane between the cope and the drag of the numerically controlled blow molding machine;

releasing and opening the cope, such that the hollow compact remains in the drag; and then cutting said hollow compact within the drag with the laser beam along the portion of the hollow compact that was located on the divided plane of the cope and the drag of the numerically controlled blow molding machine; thereby manufacturing a solid three-dimensional resin product compact.

7. The method of manufacturing a three-dimensional resin product in accordance with claim 6, wherein said additive is titanium dioxide.

* * * * *